UNITED STATES PATENT OFFICE.

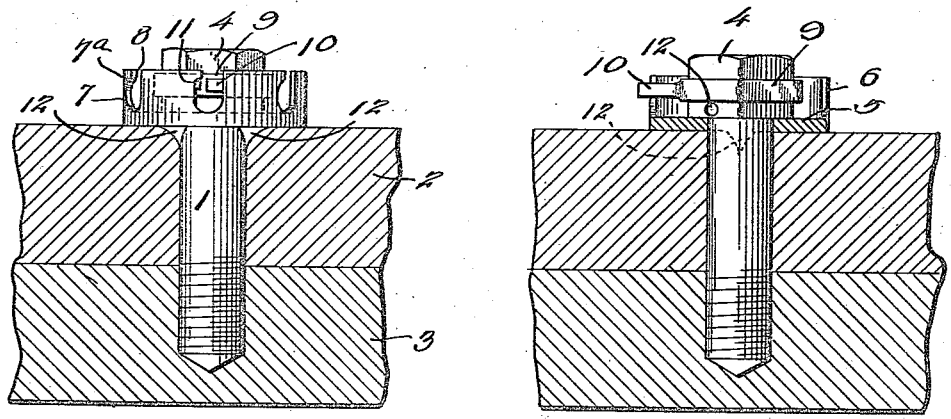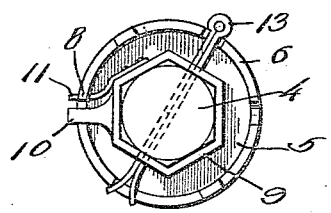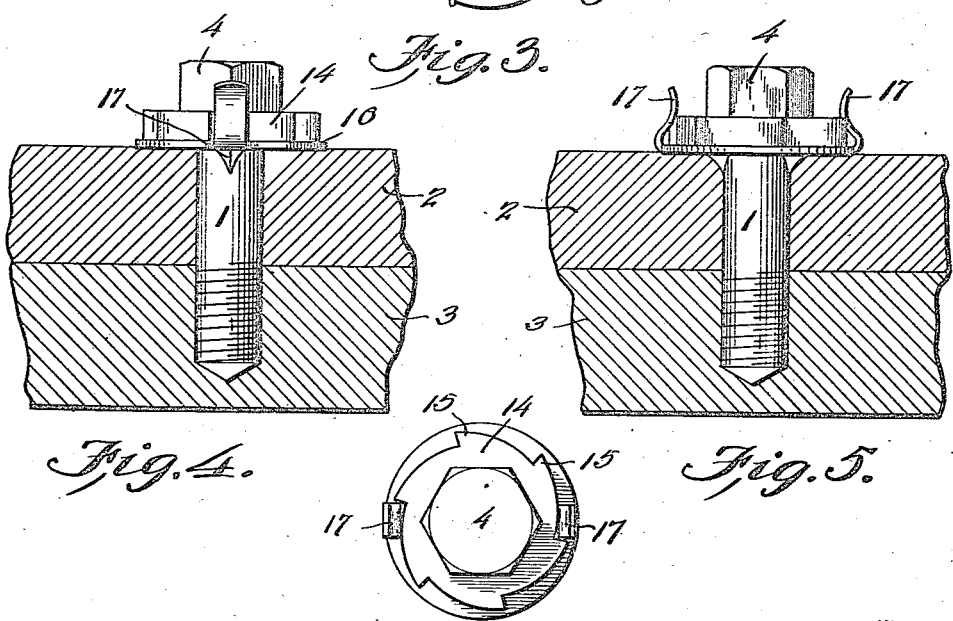

WILLIAM D'ARDEN, OF SAN JOSE, CALIFORNIA.

CAP-SCREW LOCK.

1,269,059.   Specification of Letters Patent.   Patented June 11, 1918.

Application filed May 11, 1917. Serial No. 168,015.

*To all whom it may concern:*

Be it known that I, WILLIAM D'ARDEN, a subject of the King of Great Britain, residing at San Jose, in the county of Santa Clara and State of California, have invented certain new and useful Improvements in Cap-Screw Locks, of which the following is a specification.

This invention relates to cap screw locks. One of the main objects of the invention is to provide simple and efficient means for preventing reverse rotation of a cap screw after the same has been secured in proper position. A further object is to provide a lock of simple construction which may be quickly and easily applied to a cap screw of standard construction. Further objects will appear from the detailed description.

In the drawings:—

Figure 1 is a side view of a cap screw with a locking means constructed in accordance with my invention applied, Fig. 2 is a similar view taken in a plane at right angles to Fig. 1, the locking washer being centrally sectioned, Fig. 3 is a top plan view, Fig. 4 is a view similar to Fig. 1 of a modified form of the locking means, Fig. 5 is a side view taken in a plane at right angles to Fig. 4, and Fig. 6 is a top plan view of the modified form of locking device.

The cap screw 1 is inserted through the upper piece of material 2 and threaded into the lower piece of material 3, thus serving to secure these two members together. This cap screw is provided with the hexagonal head 4. A locking washer 5 is mounted about the cap screw beneath the head 4. This washer is provided with an integral upwardly extending rim 6, the washer and rim constituting, in effect, a cylindrical casing about the head 4. The rim 6 of the washer is provided with a plurality of equally spaced radially disposed substantially circular openings 7, a short vertical slot 8 communicating with each opening and extending downwardly from the upper edge of rim 6. A hexagonal frame 9 is mounted snugly about the bolt head 4. This frame is provided with an integral outwardly extending finger 10 which is adapted to fit through one of the openings 7 of rim 6, selectively. A leaf spring 11 is secured to one side of frame 9 and is bent so as to extend downwardly in substantial parallelism with, and in spaced relation to, finger 6.

The locking washer 5 is provided, on its under face, with the diametrically opposite gripping teeth 12. When the cap screw has been turned inward into its inner-most position, the locking washer is forced tightly down on the upper piece of material 2, causing the teeth 12 to bite into member 2 thus effectually securing the locking washer against rotary movement. After the cap screw has thus been turned into position and the locking washer secured against rotation, the frame 9 is placed about the head 4 of the screw with finger 10 projecting through one of the openings 7, the slot 8 being of sufficient width to permit this finger to be placed in the opening. The leaf spring 11 is, simultaneously with the insertion of finger 10, also inserted in the opening 7. This leaf spring engages under the shoulder 7ª of opening 7 adjacent slot 8, thus effectually preventing accidental displacement of frame 9. By this means, the cap screw acts to firmly secure the locking washer against rotation, and the frame 9 is so connected to this washer as to effectually prevent rotation of the cap screw relative to the washer. If desired, the head 4 of the cap screw may be provided with a diametrical bore 12 through which may be inserted a cotter pin 13, this cotter pin being also passed through diametrically opposite openings 7 in the vertical rim 6 of the locking washer. By providing this cotter pin, even though the frame 9 should become displaced, the cotter pin will act to positively prevent rotation of the cap screw.

In Figs. 4 to 6 of the drawings, I have shown a modified form of my device which operates in a very similar manner to the form just described. A locking plate 14 is secured to the stem of cap screw 1 adjacent the head 4. This plate is of ratchet wheel construction, being provided with a plurality of radially disposed equally spaced teeth 15. A locking washer 16 is mounted beneath plate 14 and is provided with the diametrically opposite gripping teeth 17 which bite into the upper member 2 so as to effectually lock the washer against rotation. The washer is further provided with the two diametrically opposite resilient locking fingers 17. These fingers are formed integrally with the washer by stamping and are then turned upward and bent inward so as to engage the teeth 15 of the locking plate. The teeth of the locking plate are so directed as to permit rotation of the cap screw so as to thread it into the lower member 3, the resilient locking fingers 17 of the washer passing over the teeth during this operation. As will be clear from Fig. 6 of the drawings, the fingers 17 engage in front of teeth 15 thus effectually preventing reverse rotation of the cap screw.

What I claim is:—

In cap screw locking means, the combination with a member to be secured and a cap screw threaded into the same; of a locking washer mounted about the stem of the screw and provided on its underface with downwardly directed gripping teeth, a locking plate secured on the stem of the screw adjacent the head of the same and provided with a plurality of peripheral similarly directed teeth, and a plurality of upwardly directed resilient locking fingers formed integral with the locking washer at the periphery thereof, said fingers having their intermediate portions arched inwardly so as to engage the teeth of the locking plate and prevent reverse rotation thereof.

In testimony whereof I affix my signature in presence of two witnesses.

WILLIAM D'ARDEN.

Witnesses:
A. B. FRIANT,
L. E. CARNES.